US011052946B2

(12) United States Patent
Walker

(10) Patent No.: US 11,052,946 B2
(45) Date of Patent: Jul. 6, 2021

(54) MODULAR RECONFIGURABLE VEHICLE FRAME SYSTEM

(71) Applicant: Patrick A. Walker, St. Petersburg, FL (US)

(72) Inventor: Patrick A. Walker, St. Petersburg, FL (US)

(*) Notice: Subject to any disclaimer, the term of this patent is extended or adjusted under 35 U.S.C. 154(b) by 111 days.

(21) Appl. No.: 16/383,008

(22) Filed: Apr. 12, 2019

(65) Prior Publication Data

US 2019/0315406 A1 Oct. 17, 2019

Related U.S. Application Data

(60) Provisional application No. 62/656,549, filed on Apr. 12, 2018.

(51) Int. Cl.
| | |
|---|---|
| *B62D 21/02* | (2006.01) |
| *B60G 3/20* | (2006.01) |
| *B60P 3/22* | (2006.01) |
| *B62D 24/02* | (2006.01) |
| *B60N 2/015* | (2006.01) |
| *B62D 25/08* | (2006.01) |
| *B62D 63/06* | (2006.01) |
| *B62D 33/02* | (2006.01) |

(52) U.S. Cl.
CPC .............. *B62D 21/02* (2013.01); *B60G 3/20* (2013.01); *B60N 2/015* (2013.01); *B60P 3/22* (2013.01); *B62D 24/02* (2013.01); *B62D 25/08* (2013.01); *B62D 33/02* (2013.01); *B62D 63/06* (2013.01); *B60G 2206/10* (2013.01)

(58) Field of Classification Search
CPC .............. B62D 21/02; B60G 3/20; B60P 3/22
See application file for complete search history.

(56) References Cited

U.S. PATENT DOCUMENTS

| | | | | |
|---|---|---|---|---|
| 6,120,076 A | * | 9/2000 | Adsit ........................ | B60P 3/40 296/26.11 |
| 7,827,738 B2 | * | 11/2010 | Abrams .................. | E04B 1/348 52/79.1 |
| 2008/0231067 A1 | * | 9/2008 | Nagle ....................... | B60P 3/40 296/50 |

* cited by examiner

*Primary Examiner* — Faye M Fleming

(57) ABSTRACT

A modular, reconfigurable frame that can be combined into multiple standardized segments to create different core vehicle configurations is described herein. The frame includes a plurality of components that affix together universally to make multiple versions of cycle, vehicle, and airframe styles. The reconfigurable frame includes a quick pin and fastener that allows for transportation platforms to be incorporated into the frame in a modular fashion.

20 Claims, 7 Drawing Sheets

MODULAR RECONFIGURABLE VEHICLE FRAME SYSTEM

CROSS-REFERENCES TO RELATED APPLICATIONS

This application is a non-provisional and claims benefit of U.S. Provisional Patent Application No. 62/656,549, filed Apr. 12, 2018, the specification(s) of which is/are incorporated herein in their entirety by reference.

BACKGROUND OF THE INVENTION

Field of the Invention

The present invention features a modular and reconfigurable frame that is able to combine multiple standardized segments to create different vehicle configurations.

Background Art

Bicycles and motorcycles have been used for many decades to provide economical, versatile transportation. Vehicle flexibility is desirable if the vehicle is to be used for police or military purposes, sport and utility purposes, rescue efforts, and even space exploration. Hence, there exists a need for a modular, reconfigurable vehicle capable of providing a mode of transportation in a wide range of services.

BRIEF SUMMARY OF THE INVENTION

It is an objective of the present invention to provide systems that combine frame segments to form various vehicle configurations, as specified in the independent claims. Embodiments of the invention are given in the dependent claims. Embodiments of the invention can be freely combined with each other if they are not mutually exclusive.

In some aspects, the present invention features a modular vehicle frame system comprising a backbone frame and a box carriage. The backbone frame may comprise two parallel bars connected to each other by bar segments to form a quadrilateral shape. One of the parallel bars may comprise a first plurality of attachment apertures disposed along a length of the bar. The second parallel bar may include a first frame connector extending from one end thereof, a second frame connector disposed on an opposite end, and a second plurality of attachment apertures disposed along a length of the bar. In one embodiment, the box carriage may comprise a plurality of carriage bars arranged to form a box shape. The box carriage can include one or more brackets disposed on a top side of the carriage, a first carriage connector disposed on one end of a bottom side of the carriage, and a second carriage connector disposed on an opposite end of the bottom side. The second parallel bar of the backbone frame may be connected to the brackets so as to attach the backbone frame to the box carriage.

In other embodiments, a cargo bed frame may be used alternate to the backbone frame. The cargo bed frame may comprise a plurality of cargo bars connected to each other to form a rectangular frame, and a frame support bar attached to the rectangular frame such that frame support bar bisects the rectangular frame. In one embodiment, the frame support bar may include a first frame connector extending from one end thereof, a second frame connector disposed on an opposite end, and a plurality of attachment apertures disposed along a length of the bar. In some embodiments, the frame support bar may be connected to the brackets of the box carriage so as to attach the cargo bed frame to the box carriage.

One of the unique and inventive technical features of the present invention is backbone frame or the cargo bed frame attached to the box carriage. Without wishing to limit the invention to any theory or mechanism, it is believed that the technical feature of the present invention advantageously provides a base frame structure to which various components can be attached and combined, thereby allowing for different vehicle configurations to be formed. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIGS. 4A-4D show a non-limiting embodiment of the vehicle frame system reconfigured with the motorcycle to form a utility terrain vehicle, wherein FIG. 4A is a top view, FIG. 4B is a back view, FIG. 4C is a side view, and FIG. 4D is a front view.

FIGS. 5A-5C is another non-limiting embodiment of the frame system configured with the motorcycle to form a utility terrain vehicle having two rows of seating, wherein FIG. 5A is a side view, FIG. 5B is a top view, and FIG. 5C is a front view.

DETAILED DESCRIPTION OF THE INVENTION

Figure 1:
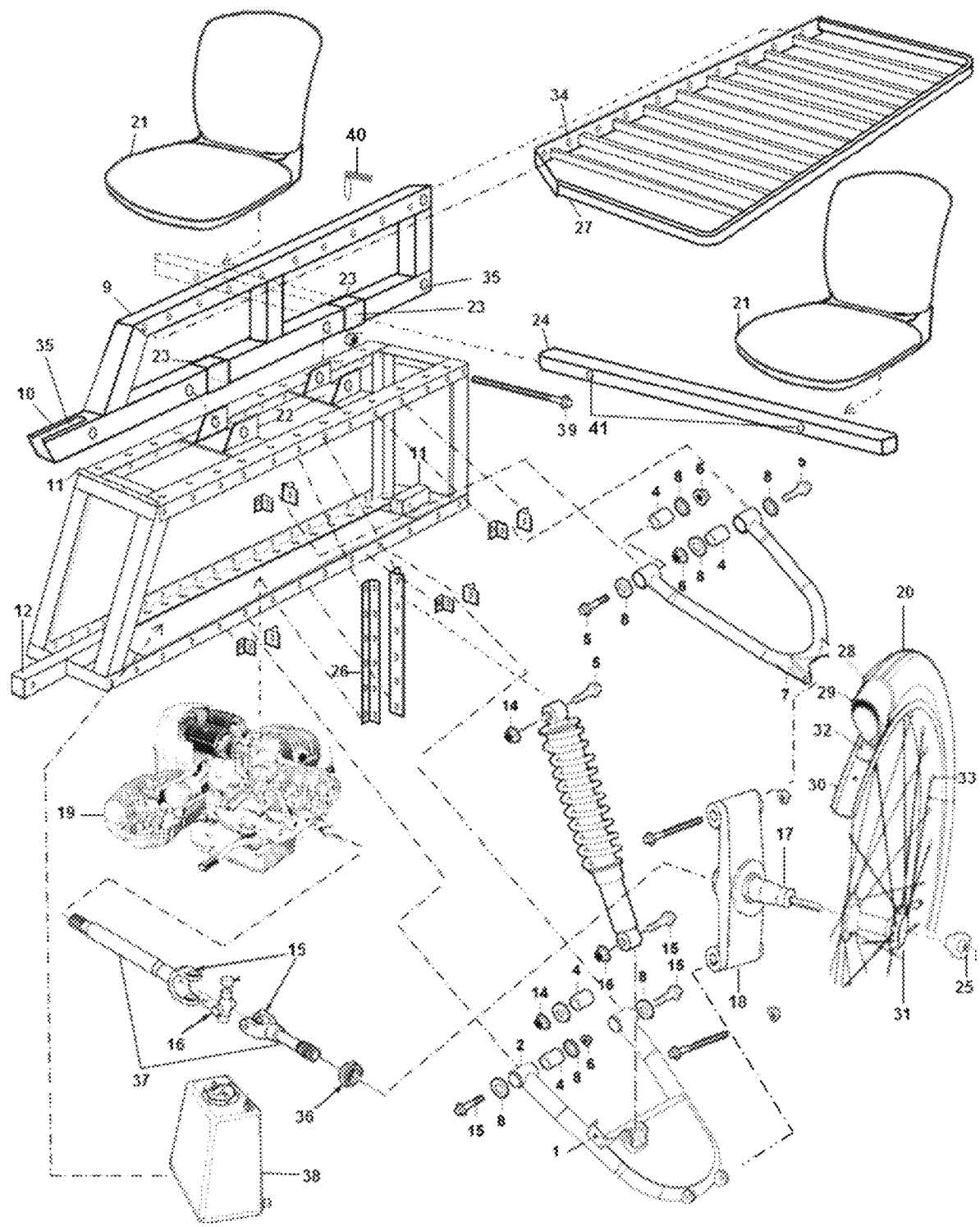
FIG. 1 shows a non-limiting embodiment of a modular and reconfigurable vehicle frame system of the present invention.

Following is a list of elements corresponding to a particular element referred to herein:
1 Lower A-arm
2 A-arm connector
3 Box carriage sub-frame
4 Bushing
5 Bolt
6 Locking Nut 7 Upper A-arm
8 Washer
9 Backbone Frame
10 Backbone male receiver with pin hole
11 Box carriage female receiver with pin hole
12 Box carriage male receiver with pin hole
13 Shock assembly
14 Shock nut
15 U-joint
16 Yoke
17 Spindle Axle
18 Axle housing
19 Engine assembly
20 Wheel assembly
21 Removable Seat
22 Backbone coupler
23 Seat bar channel
24 Seat bar
25 Hub nut
26 Adjustable shock mount
27 Rack
28 Tire
29 Tube
30 Rim
31 Hub assembly
32 Spokes
33 Rim tape
34 Rack bolt holes
35 Backbone seat tube slot
36 Barring
37 Half Shaft drive
38 Box carriage fuel tank
39 Spindle housing bolt
40 Frame pin
41 Seat pin holes uses standard frame or hitch pins
50 First frame connector
51 Second frame connector
52 Male receiver
53 Female receiver
54 Cargo bar
55 Attachment aperture
56 Frame support bar
57 Hinge An All-Terrain Vehicle (ATV) is typically a four or six wheel vehicle, sometimes tracked or eight wheeled or any combination of segments, or 'Quad' style cycle with the rider sitting center handlebar in bike rider fashion. A Utility Terrain Vehicle (UTV), often called a 'Side by Side', is akin to an all-terrain golf cart fashion that applies to 4, 6, 8 wheel vehicles track or combination thereof.

A seat tube frame connector refers to an attachment point or link comprising a male component and a female receiver for receiving said male component. For example, the frame connector may be a 2"×2" or a Class 2 hitch. In one embodiment, a bike seat tube may be fused in the center of a 2"×2" frame connectors or rear facing female receiver. In another embodiment, the vehicle frame system may include a frame connector as a front facing universal structural attachment point.

A Universal Cycle System is a term encompassing greater derivatives of modular bicycles, motorcycles, ATVs/UTVs and multi-wheeled or tracked cycle or craft variations and system. It applies as the structural basis of small vehicles and light craft by use of the head and seat tube frame connector.

A Utility Terrain Crossover (UTX) describes the unique configuration that the Universal Cycle System can reconfigure, in any combination that half of a 4-, 6-, or 8-wheel (or tracked) and body of a vehicle can be split down the middle having ATV or UTV features on either side. A non-limiting example of a UTX is a driver and medic seated on one side of the 4- or 6-wheeler and a flat rack space the length of the other side to accommodate a victim lying in a stretcher. The vehicle can also be configured to have different front and rear halves.

As used herein, the box carriage or frame carriage refers to a sub frame that provides cycle structure to the ground.

A bracket bar is a supplemental reinforcing bar disposed on the bottom of the bike/cycle frame that adds structural rigidity along the length of the separable base bike frame or modular fame segments. For example, the bracket bar is a standard reinforcing bar for connecting the front to the back of Universal Cycle System based on a Class 3 receiver hitch 1.25"×1.25", on the bike frame bottom edge. In some embodiments, the reinforcing bar may be attached in place of kickstand when attached to a bike.

In some embodiments, a box carriage suspension assembly connects using 1.5×1.5 inch female connectors. It serves as the cycles lower frame to frame or lower to a lower bracket bar. In some embodiments, it can have a modular detachable rear shock and A-arm suspension assembly so a cycle can have a long stretch in the middle or many wheels or caterpillar like effect as support to a heavy weight. In other embodiments, the carriage can be set up as its own source of locomotion by mounting an engine within the box structure. In some other embodiments, if electric hubs are used, the batteries and electric controls may be housed and enclosed within the box.

In some embodiments, a backbone frame unit or frame spine can pin to a base bike seat tube frame connector or other frame units that uses 2"×2" male to female connectors. In one embodiment, this unit can serve as a reconfigurable seat mount when used with the perpendicular seat bar. In another embodiment, it can be the spine for an interlocking rack system or half seat and rack for medical transport.

In other embodiments, a cargo bed frame may be used alternate to the backbone frame bar. The cargo bed frame may be a straight bar that is standard length as a backbone unit but is flat against the box carriage. In some embodiments, it can pin to lower box sub frame mounts. It can serve as a base for cargo box support with a locking tilt bed option.

In some embodiments, the wheel assembly may be street, or no wheel, road, off-road, or tracked. In other embodiments, the wheel assembly may be used in conjunction with a split track, tread 'track over tire', split wheel, or tread with skis. As used herein, the term "tread" refers to any rubberized, interlinked belt or chained/rubberized 'belt over tire' traction modification. As used herein, the term "tracked" refers to any designated, belt linked or chained traction modification unit used alternative to or in conjunction with a wheel.

Referring now to FIGS. 1-5C, the present invention features a modular vehicle frame system comprising a backbone frame and a box carriage. In some embodiments, the backbone frame may comprise two rigid parallel bars connected to each other by two or more bar segments to form a quadrilateral shape. One of the parallel bars may comprise a first plurality of attachment apertures disposed along a length of the bar. The second parallel bar may include a first frame connector extending from one end thereof, a second frame connector disposed on an opposite end, and a second plurality of attachment apertures disposed along a length of the bar. The second parallel bar may further include one or more channels disposed through the bar. The vehicle frame system may further comprise one or more seat bars disposed through the channels of the second parallel bar such that the seat bar is orthogonal to the backbone frame. The seat bar may be configured to have one or more seats removeably attached thereto.

In some embodiments, the box carriage may comprise a plurality of carriage bars arranged to form a box shape. For example, the carriage bars may be arranged to form a frame structure having 8 vertices and 12 edges. In one embodiment, the box carriage includes one or more brackets disposed on a top side of the carriage. In another embodiment, the box carriage includes a first carriage connector disposed on one end of a bottom side of the carriage, and a second carriage connector disposed on an opposite end of the bottom side.

As shown in FIG. 1, the second parallel bar of the backbone frame may be connected to the one or more brackets via a frame pin disposed through the second plurality of attachment apertures and the brackets, thereby attaching the backbone frame to the box carriage. In one embodiment, the frame is attached to the carriage such that the first frame connector and the first carriage connector are disposed on a same side of the system, and the second frame connector and the second carriage connector are disposed on an opposing side of the system.

Figure 2A:
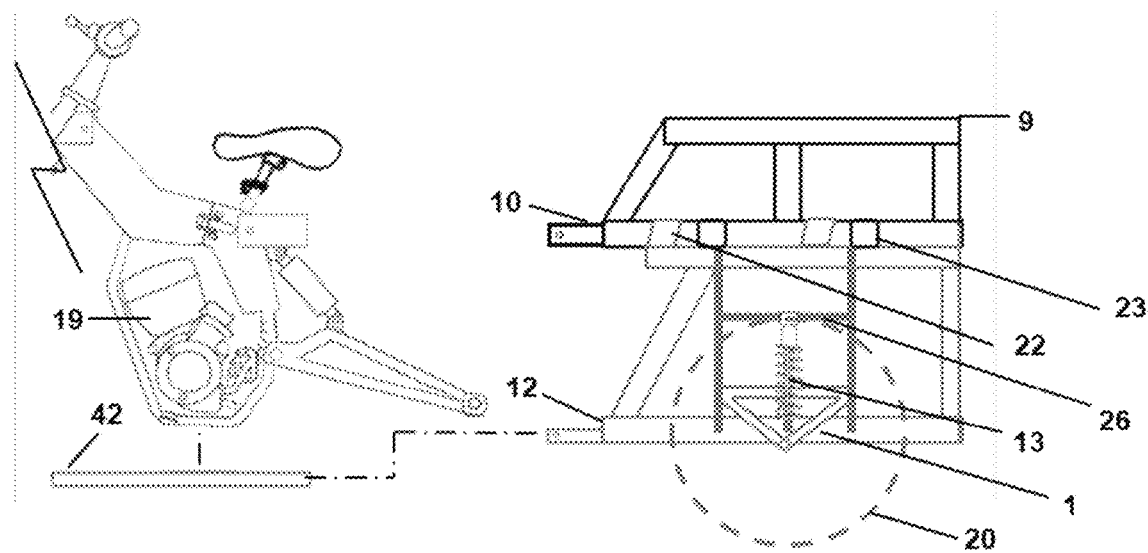
FIG. 2A is a non-limiting embodiment of the vehicle frame system mechanically coupled to a motorcycle.
Figure 2B:
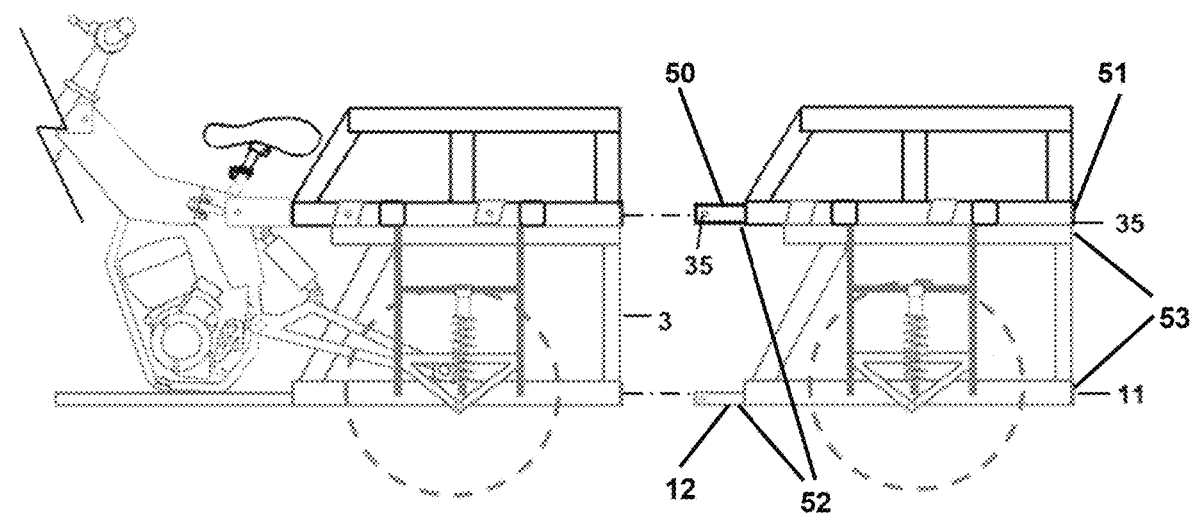
FIGS. 2B-2D show non-limiting embodiments of multiple vehicle frame systems mechanically coupled to the motorcycle and to one another.
Figure 2C:
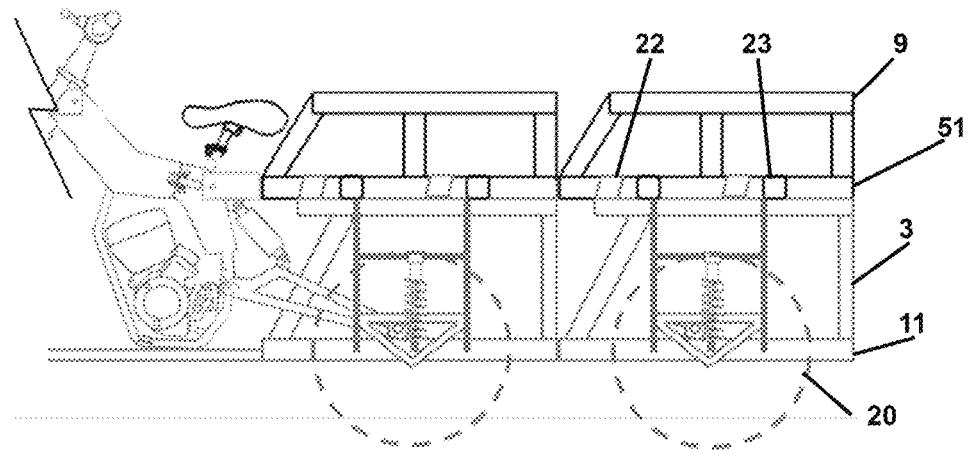
Figure 2D:
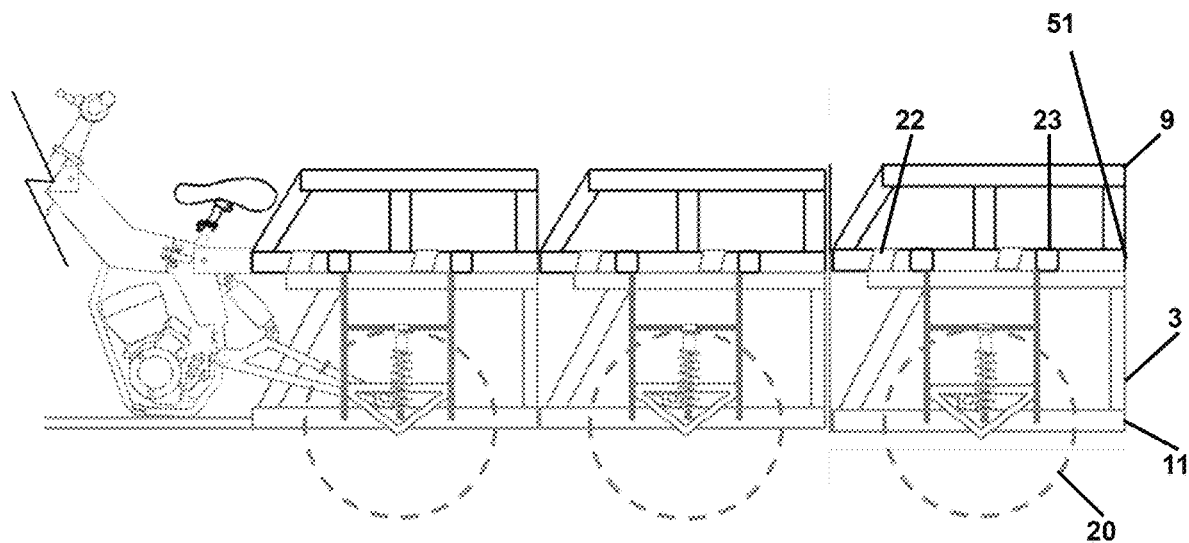

As shown in FIG. 2A, in some embodiments, the modular vehicle frame system may be connected to a vehicle via the first frame connector and the first carriage connector connecting to receiving connectors of the vehicle. As shown in FIG. 2B, in other embodiments, the modular vehicle frame system may be connected to another frame system via the first frame connector and the first carriage connector connecting to the second frame connector and the second carriage connector of the other frame system respectively.

Figure 3A:
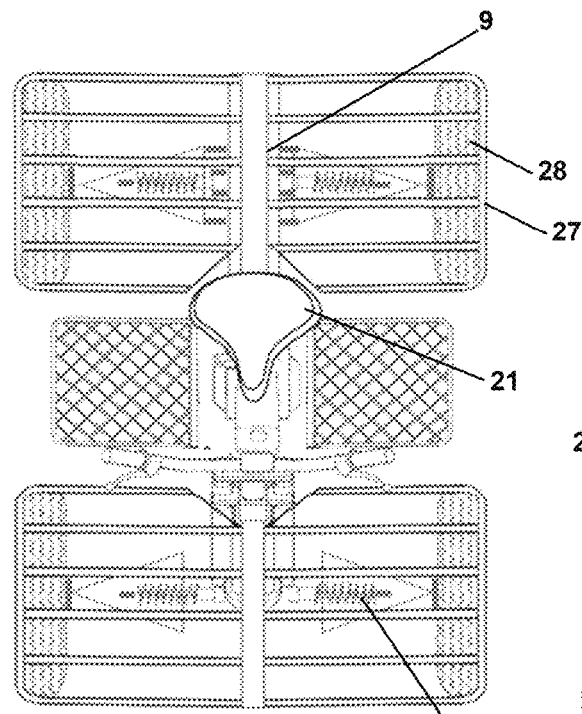
FIGS. 3A-3C show a non-limiting embodiment of the vehicle frame system reconfigured with the motorcycle to form an all-terrain vehicle, with FIG. 3A being a top view, FIG. 3B being a front view, and FIG. 3C being a side view.
Figure 3B:
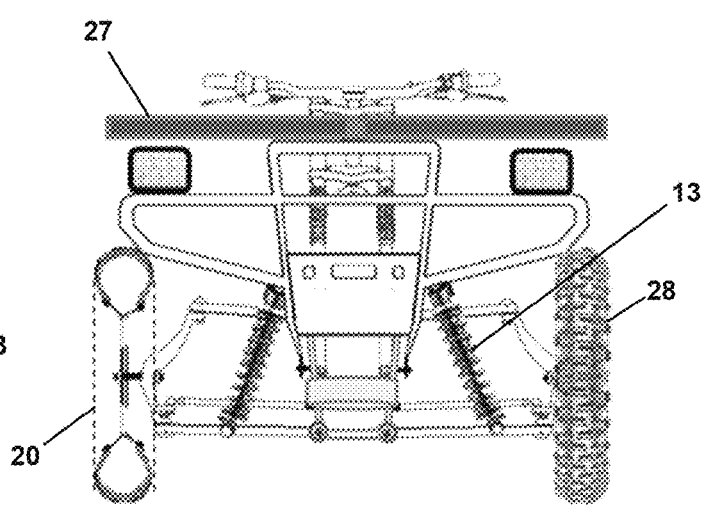
Figure 3C:
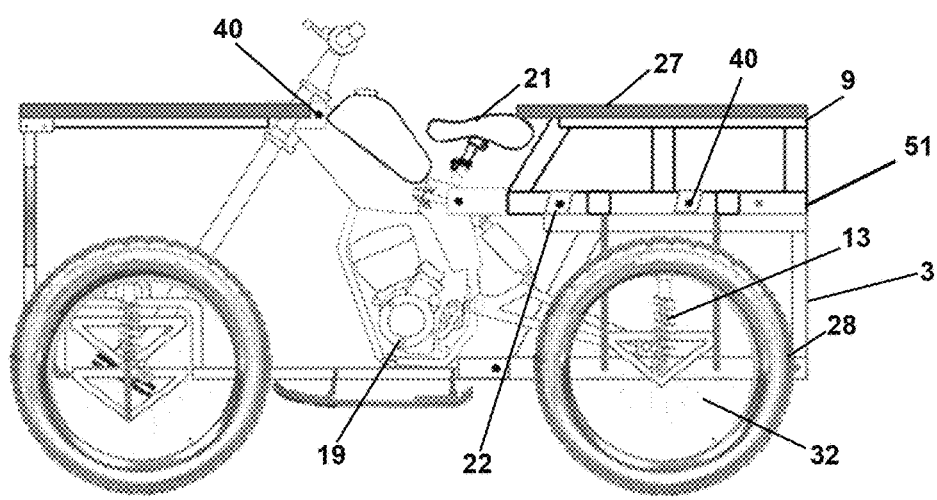
Figure 4A:
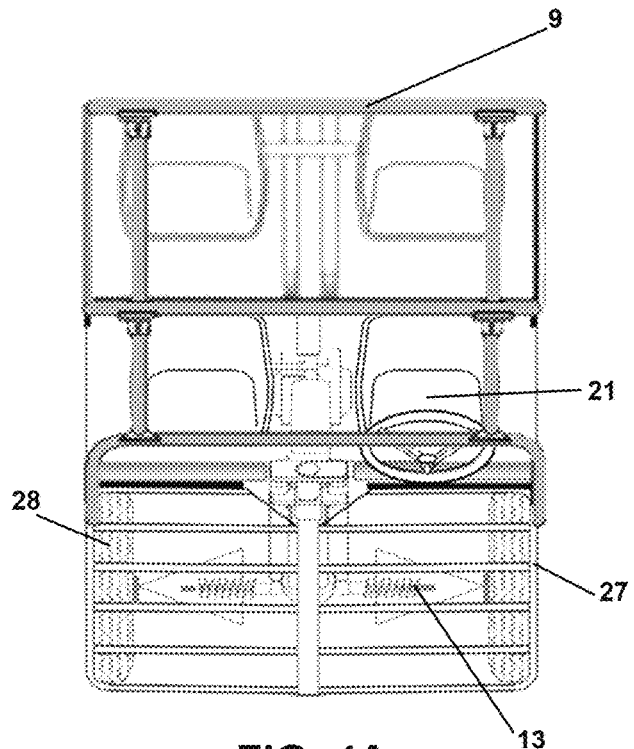
Figure 4B:
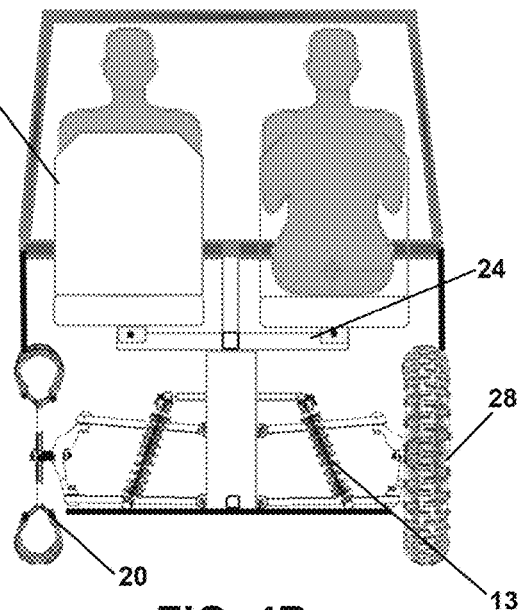
Figure 4C:
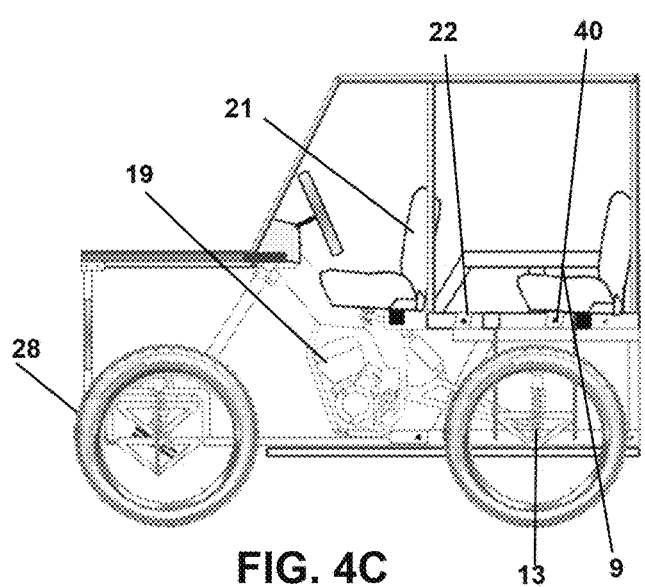
Figure 4D:
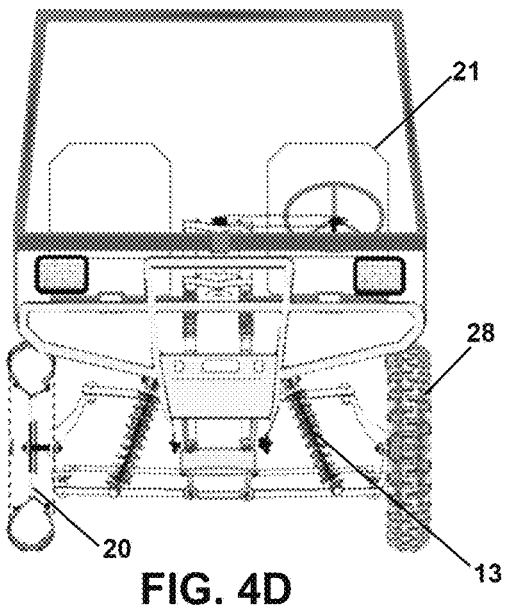
Figure 5A:
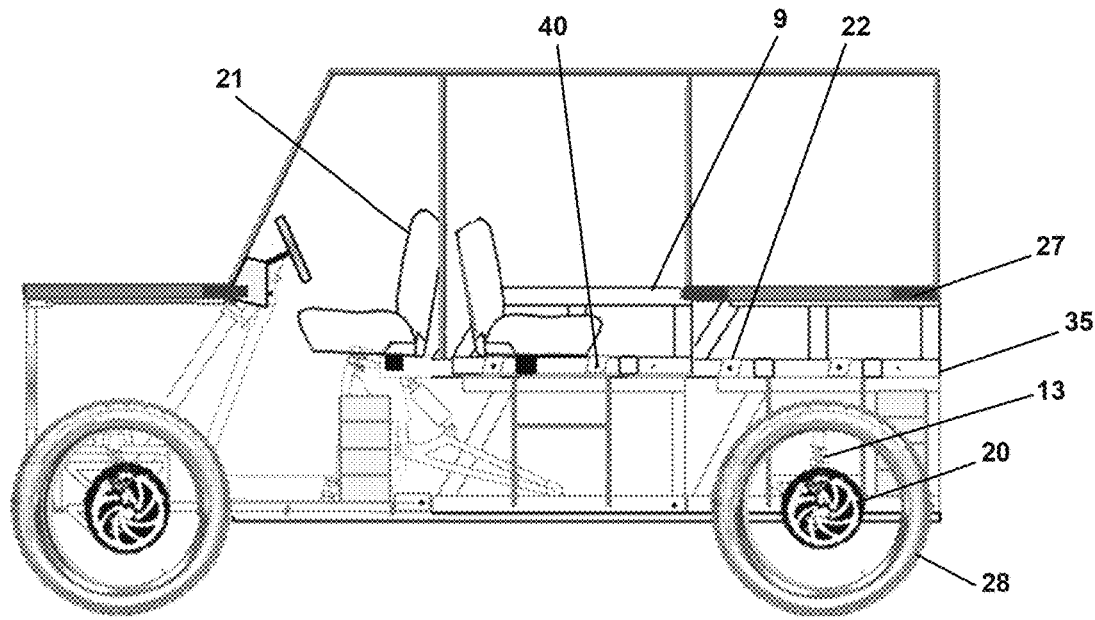
Figure 5B:
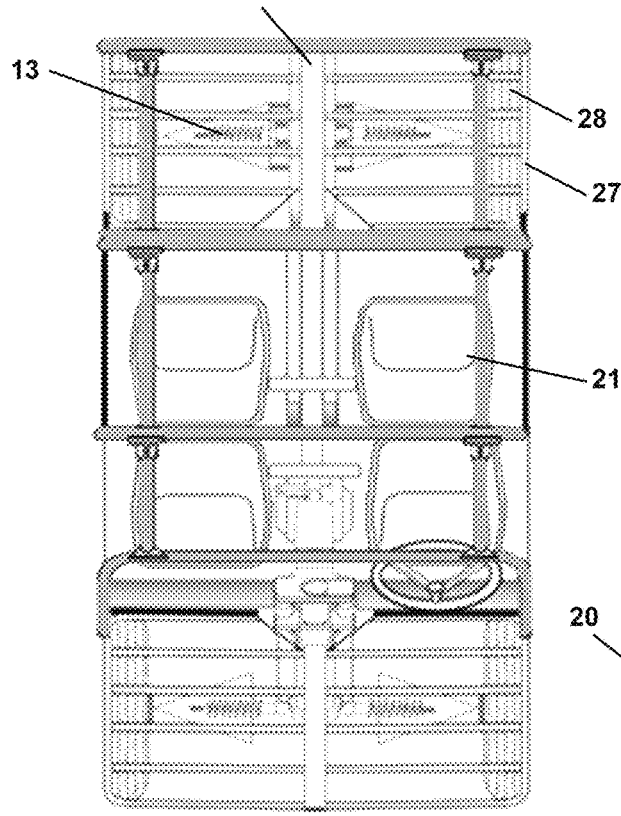
Figure 5C:
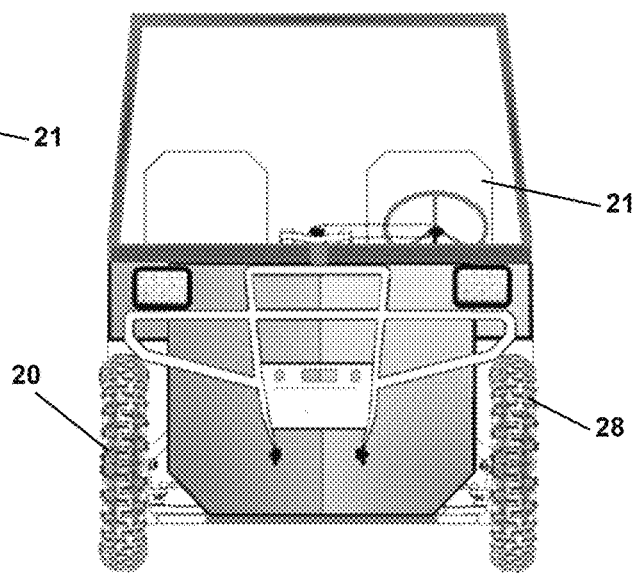

As shown on FIGS. 3A, 4A, and 5B, the modular vehicle frame system may further comprise one or more racks removeably attached to the first plurality of attachment apertures of the backbone frame. In one embodiment, the one or more racks may be attached to the first plurality of attachment apertures via frame pins.

Figure 6A:
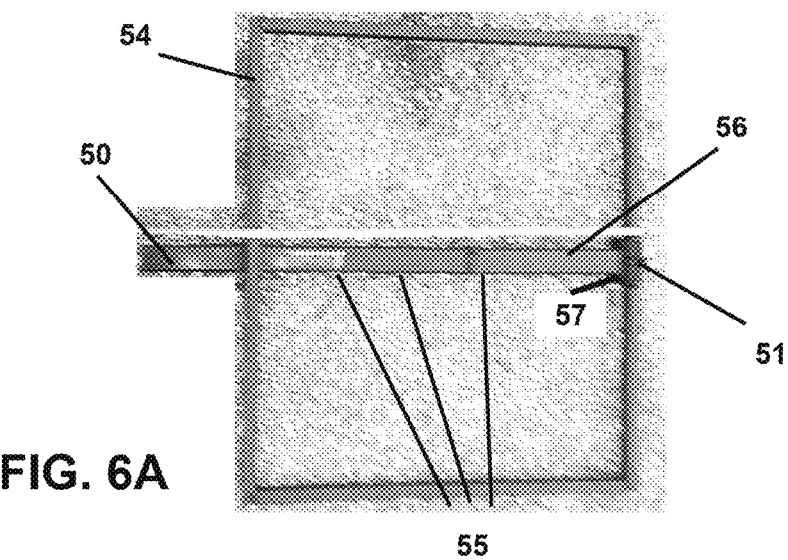
FIGS. 6A-6C show non-limiting embodiments of a cargo bed frame that may be used in accordance with the vehicle frame system.
Figure 6B:
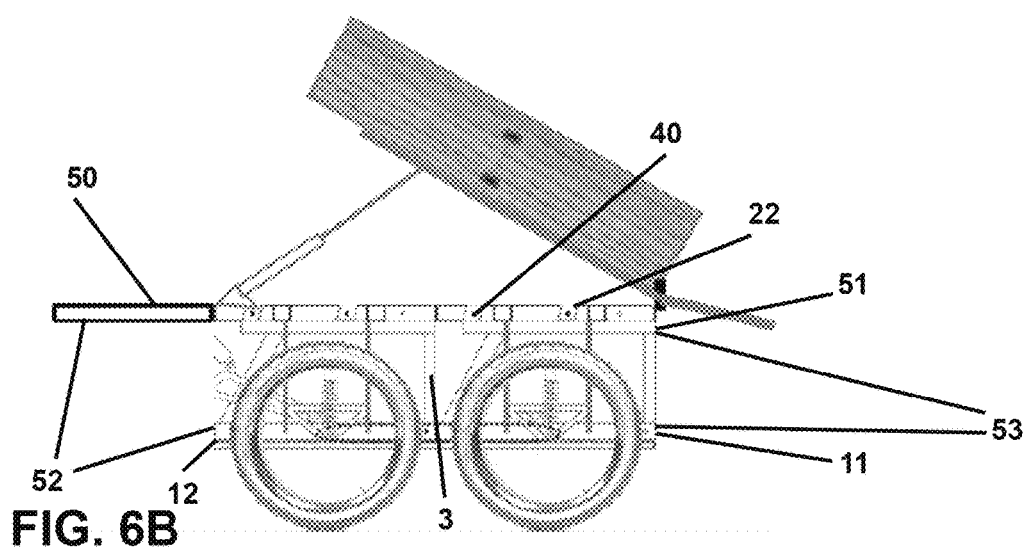
Figure 6C:
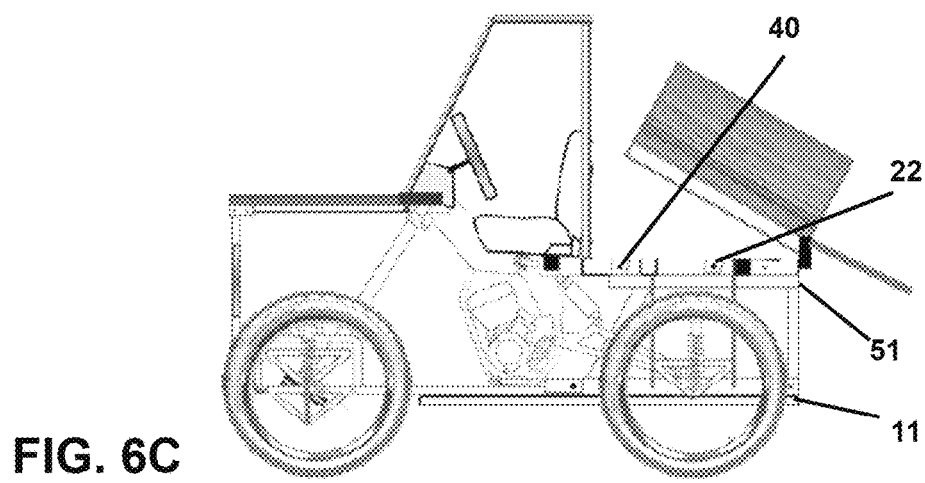

Referring to FIGS. 6A-6C, another embodiment of the modular vehicle frame system may comprise a cargo bed frame and the box carriage as previously described. The cargo bed frame may be used alternate to the backbone frame. In some embodiments, the cargo bed frame may comprise a plurality of cargo bars connected to each other to form a rectangular frame, and a frame support bar attached to the rectangular frame such that frame support bar bisects the rectangular frame. In one embodiment, the frame support bar may include a first frame connector extending from one end thereof, a second frame connector disposed on an opposite end, and a plurality of attachment apertures disposed along a length of the bar. In some embodiments, the frame support bar may be connected to the one or more brackets of the box carriage via a frame pin disposed through the plurality of attachment apertures and the brackets. Preferably, the cargo bed frame is attached to the box carriage such that the first frame connector and the first carriage connector are disposed on a same side of the system, and the second frame connector and the second carriage connector are disposed on an opposing side of the system. In a similar way, the vehicle frame system with the cargo box frame can be connected to a vehicle via the first frame connector and the first carriage connector connecting to receiving connectors of the vehicle, or to another frame system via the first frame connector and the first carriage connector connecting to the second frame connector and the second carriage connector of the other frame system, respectively.

In one embodiment, the system may further include a cargo box or panels configured to attach to the cargo bed frame to form a trailer or trunk. The cargo box may be attached to the cargo bed frame via hinges such that the cargo box tilts or rotates about the cargo bed frame. In another embodiment, as shown in FIG. 6A, the rectangular frame may be attached to the frame support bar via a hinge such that the rectangular frame tilts or rotates about the frame support bar.

In other embodiments, the system may further comprise a cargo camper shell cover configured to attach to the cargo bed frame. In yet other embodiments, the system may further comprise one or more racks configured to attach to the cargo bed frame. For example, the racks may be attached to the cargo bed frame via pins, hooks and loops, or other types of fasteners.

As shown in FIG. 1, in some embodiments, the modular vehicle frame system may include one or more wheel assemblies attached to the box carriage. The wheel assembly may comprise an A-arm, a shock, a shock mount, a wheel, and a wheel axle. In other embodiments, a container or tank may be removeably attached to the box carriage. In some other embodiments, an engine may be removeably attached to the box carriage.

In one embodiment, the first frame connector and the first carriage connector are male receivers, and the second frame connector and the second carriage connector are female receivers. In an alternate embodiment, the first frame connector and the first carriage connector are female receivers, and the second frame connector and the second carriage connector are male receivers.

According to some embodiments, the present invention features a multi-vehicle modular sub frame comprising a modular wheel cycle that is in two parts that interconnects a multi wheeled cycle based on a Class-II or 2"×2" trailer hitch in the backbone frame the cycle head or seat tube. A modular suspension unit may comprise a sub frame bracket and a set of two opposing upper and 1.5"×1.5" connectors are mounted and lower triangular A-arms with shocks. Thus, a vehicle may be configured as long as desired and as practical.

Referring to FIGS. 1-2A, in some embodiments, the rear of the cycle modular frame segment system may comprise: a standardized extension of the cycles core frame via the receiver at the back of the seat tube, based on a Class-II or 2"×2" trailer hitch with a corresponding hitch receiver system at the back of the rear cycle frame unit's seat tube secured with a locking pins. A frame segment may be comprised of a frame spine mounted on a frame carriage. From this core, any structural or cosmetic facets will be attached thereto. In one embodiment, a frame spine can serve as the rigid base to a luggage rack or cargo bed. In another embodiment, a seat bar may be added perpendicular for attaching passenger seats. In some embodiments, a frame carriage is affixed under the frame spine thereby increasing the frames structural base and serving as an attachment point for A-arm suspension components. The modularity of the frame can allow for an entire vehicle to be disassembled, so that it can pass through small passages, such as a 36" hole, and then reassembled in minutes.

Referring to FIGS. 2B-5C, in some embodiments, if more than one frame segment is attached to the cycle's rear frame unit, the rear most frame segment may have wheels attached, if not within a body package. The rear frame unit's receiver accommodates the quick attachment of luggage racks, a point to affix a suspension bracket unit, a base for adjoining frame segments front and back, or as a structural point of attachment into the cycle frames units as engine mounts or creating the basis of multiple crafts. In some embodiments, for every frame segment added or extended, this can provide a possible wheel set such as a dual axle setup. In other embodiments, for every additional wheel set, this creates a 'centipede like' wheel configuration and segments in standardized lengths.

Referring to FIGS. 6A-6C, in some embodiments, the present invention may further include an extendible cargo box comprising a modular cargo box with sliding or hoop locks. In one embodiment, equal dimensions of the standard segment rack with higher walls may form a cargo box that has a center bar taking the place of the segment spine and can join together with sliding latches to become longer as the cycle becomes longer as per additional fame segments. In one embodiment, the box bed may tilt on a rear hinge of one to two lengths, thus becoming a modular tilt bed.

In other embodiments, the present invention may be configured to modular vans, boxes, or trunks comprising a box trunk accessory of two segmented length panel van or cargo box mounted on a centerline spine bar. This can transform an extended segment frame into a utility van or tilt bed. A cargo box trunk has a base bar that is flat on the box carriage and takes the place of a backbone frame segment, adding an accessory box in place of a rack or towed behind a cycle on a frame segment as a trailer. The box trunk base bar has a lower profile than a backbone unit and allows for larger containers while keeping the weight balance lower.

In some embodiments, the present invention includes modular seat arrangements comprising folding reversible boat seat, or one or more bench seats, pinned to the backbone frame. In one embodiment, the folding reversible boat seats can be used via a sear bar to create many seating configurations in forward and reverse. In some embodiments, when two frame segments are used together, the bench seats can be used on either side or as a pair.

In one embodiment, the present invention includes modular segmented trailer comprising any combination of frame segments, luggage racks, tilting cargo boxes, or box trunk. The trailer may include any kind of seating, as well as any kind of wheel combination, and may be covered or uncovered. This creates a modular trailer from cycle frame segments, via a receiver tow bar attachment. It can use a male receiver inserted with a tow bar that is either an upper or lower receiver with 1.25" to 2" or with an adapter. In other embodiments, it can be substituted with a trunk or van configuration provided the male frame receivers align with the corresponding size.

In further embodiments, the present invention utilizes quick pin attachments for racks, cargo beds, seats, gas tanks or extended body components. The Universal Cycle System uses pins to enable rapid changing of the orientation of the bike/cycle/craft parts securely. The different configurations may share some attachment points and/or may utilize different attachments with a standardized pin and frame hole alignment system.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A modular vehicle frame system comprising:
   a) a backbone frame comprising two rigid parallel bars connected to each other by two or more bar segments to form a quadrilateral shape, wherein one of the parallel bars comprises a first plurality of attachment apertures disposed along a length of the bar, wherein the second parallel bar includes a first frame connector extending from one end thereof, a second frame connector disposed on an opposite end, a second plurality of attachment apertures disposed along a length of the bar, and one or more channels disposed through the bar; and
   b) a box carriage comprising a plurality of carriage bars arranged to form a box shape, wherein the box carriage includes one or more brackets disposed on a top side of the carriage, a first carriage connector disposed on one end of a bottom side of the carriage, and a second carriage connector disposed on an opposite end of the bottom side;
   wherein the second parallel bar is connected to the one or more brackets via a frame pin disposed through the second plurality of attachment apertures and the brackets, thereby attaching the backbone frame to the box carriage such that the first frame connector and the first carriage connector are disposed on a same side of the system, and the second frame connector and the second carriage connector are disposed on an opposing side of the system;
   wherein the modular vehicle frame system is configured to be connected to a vehicle or another frame system via the first frame connector and the first carriage connector connecting to receiving connectors of the vehicle or to the second frame connector and the second carriage connector of the other frame system.

2. The modular vehicle frame system of claim 1 further comprising one or more seat bars disposed through the channels of the second parallel bar of the backbone frame such that the seat bar is orthogonal to the backbone frame, and one or more seats each removeably attached to a seat bar.

3. The modular vehicle frame system of claim 1 further comprising one or more wheel assemblies attached to the box carriage.

4. The modular vehicle frame system of claim 3, wherein the wheel assembly comprises an A-arm, a shock, a shock mount, a wheel, and a wheel axle.

5. The modular vehicle frame system of claim 1 further comprising one or more racks removeably attached to the first plurality of attachment apertures of the backbone frame.

6. The modular vehicle frame system of claim 5, wherein the one or more racks are attached to the first plurality of attachment apertures via frame pins.

7. The modular vehicle frame system of claim 1 further comprising a container or tank removeably attached to the box carriage.

8. The modular vehicle frame system of claim 1 further comprising an engine attached to the box carriage.

9. The modular vehicle frame system of claim 1, wherein the first frame connector and the first carriage connector are male receivers.

10. The modular vehicle frame system of claim 1, wherein the second frame connector and the second carriage connector are female receivers.

11. A modular vehicle frame system comprising:
a) a cargo bed frame comprising a plurality of cargo bars connected to each other to form a rectangular frame, a frame support bar attached to the rectangular frame such that frame support bar bisects the rectangular frame, wherein the frame support bar includes a first frame connector extending from one end thereof, a second frame connector disposed on an opposite end, and a plurality of attachment apertures disposed along a length of the bar; and
b) a box carriage comprising a plurality of carriage bars arranged to form a box shape, wherein the box carriage includes one or more brackets disposed on a top side of the carriage, a first carriage connector disposed on one end of a bottom side of the carriage, and a second carriage connector disposed on an opposite end of the bottom side;
wherein the frame support bar is connected to the one or more brackets via a frame pin disposed through the plurality of attachment apertures and the brackets, thereby attaching the cargo bed frame to the box carriage such that the first frame connector and the first carriage connector are disposed on a same side of the system, and the second frame connector and the second carriage connector are disposed on an opposing side of the system;
wherein the modular vehicle frame system is configured to be connected to a vehicle or another frame system via the first frame connector and the first carriage connector connecting to receiving connectors of the vehicle or to the second frame connector and the second carriage connector of the other frame system.

12. The modular vehicle frame system of claim 11 further comprising one or more wheel assemblies attached to the box carriage.

13. The modular vehicle frame system of claim 12, wherein the wheel assembly comprises an A-arm, a shock, a shock mount, a wheel, and a wheel axle.

14. The modular vehicle frame system of claim 11 further comprising a cargo box or panels configured to attach to the cargo bed frame to form a trailer or trunk.

15. The modular vehicle frame system of claim 14, wherein the cargo box is attached to the cargo bed frame via hinges such that the cargo box tilts or rotates about the cargo bed frame.

16. The modular vehicle frame system of claim 11, wherein the rectangular frame is attached to the frame support bar via a hinge such that the rectangular frame tilts or rotates about the frame support bar.

17. The modular vehicle frame system of claim 11 further comprising a cargo camper shell cover configured to attach to the cargo bed frame.

18. The modular vehicle frame system of claim 11 further comprising one or more racks configured to attach to the cargo bed frame.

19. The modular vehicle frame system of claim 11 further comprising a container, tank, or engine removeably attached to the box carriage.

20. The modular vehicle frame system of claim 1, wherein the first frame connector and the first carriage connector are male receivers, and wherein the second frame connector and the second carriage connector are female receivers.

* * * * *